United States Patent
Puigardeu et al.

(10) Patent No.: US 8,711,425 B2
(45) Date of Patent: Apr. 29, 2014

(54) SELECTING ONE OF A PLURALITY OF PRINT MODES BASED ON PIXEL COVERAGE OF A DOCUMENT

(75) Inventors: Sergio Puigardeu, Barcelona (ES); Luis Garcia, Barcelona (ES); Marc Serra, Barcelona (ES); Javier Roses, Sant Quirze del Valles (ES); Angel Martinez, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 873 days.

(21) Appl. No.: 12/789,752

(22) Filed: May 28, 2010

(65) Prior Publication Data

US 2011/0292436 A1   Dec. 1, 2011

(51) Int. Cl.
*G06K 15/02* (2006.01)
(52) U.S. Cl.
USPC ........................................... 358/1.2

(58) Field of Classification Search
USPC .............................. 358/1.2, 1.9, 2.1
See application file for complete search history.

(56) References Cited

U.S. PATENT DOCUMENTS

| 6,257,693 | B1 | 7/2001 | Miller et al. |
| 7,339,686 | B1 | 3/2008 | Ward et al. |
| 2006/0087706 | A1* | 4/2006 | Shim et al. ............... 358/504 |
| 2006/0192800 | A1* | 8/2006 | Kato et al. .................. 347/9 |
| 2008/0150991 | A1* | 6/2008 | Yamane et al. ............ 347/14 |
| 2009/0161131 | A1* | 6/2009 | Fujimoto et al. .......... 358/1.9 |

FOREIGN PATENT DOCUMENTS

| JP | 2003011458 A | 1/2003 |
| JP | 2004259005 A | 9/2004 |
| JP | 2005007661 A | 1/2005 |

* cited by examiner

*Primary Examiner* — Eric A Rust (57) ABSTRACT

A method and a print apparatus are described. The method and the print apparatus allow for selecting from a plurality of print modes a print mode for a whole page of a document to be printed dependent on a print material coverage of the whole page of the document to be printed.

18 Claims, 5 Drawing Sheets

SELECTING ONE OF A PLURALITY OF PRINT MODES BASED ON PIXEL COVERAGE OF A DOCUMENT

BACKGROUND

The invention relates to the field of printing, more specifically, to a method for selecting one of a plurality of print modes for printing a document and to a printing apparatus.

Image quality and throughput are two important attributes when printing documents using a printing device, like an inkjet printing device or an electrophotographic printing device, like a laser printer. To extract the maximum potential from a printer, a deep knowledge of the available print modes and, more specifically, how the print modes perform in terms of image quality and throughput, is required, which is even more important for images that contain a mix of lines and renders or area fills.

There is a substantial image quality and throughput performance difference between print modes with high and low number of passes, which makes it very difficult for a user to correctly select an optimal print mode for a given content of a hard copy, like, for example, a plot. Conventional approaches require a user of a printing device to learn what the optimal print mode for a specific kind of printout is by trial and error, which, naturally, has an impact on the user's experience and, of course, the printer usability perception.

While methods for automatically selecting print modes are known in the field, such methods only take into account banding as the main image quality attribute to optimize. While such approaches may be of interest for printing documents having primarily graphical elements, same are useless for printing documents where lines are usually mixed with renders and small area fills. More specifically, conventional approaches try to find an optimum print mode for achieving an optimum area fill uniformity, but line drawings are not taken into account at all. In addition, such conventional approaches look at different portions of a document to be printed for determining an optimum area fill, which, in turn, may result in a change of the print mode while printing out a page of the document. This may result in artifacts at the portion where the print mode is changed, i.e. visible image quality defects may be generated.

SUMMARY OF THE INVENTION

Embodiments of the invention concern a method for selecting one of a plurality of print modes for printing a document which includes selecting from a plurality of print modes a print mode for a whole page of a document to be printed dependent on a print material coverage of the whole page of the document to be printed.

Embodiments of the invention concern a printing apparatus including a print mechanism for applying a print material to a print medium, and a controller having an input for receiving data defining a document to be printed, and an output for providing a control signal to the print mechanism, wherein the controller is configured to select from a plurality of print modes a print mode for a whole page of a document to be printed dependent on a print material coverage of the whole page of the document to be printed.

DESCRIPTION OF EMBODIMENTS OF THE INVENTION

Image quality and printing throughput are important aspects of a printing device, which are taken into account when selecting a new printer. In order to extract the maximum potential of a printer, a deep knowledge of how available print modes perform in terms of image quality and throughput is required. This knowledge is especially important for images containing a mix of lines and renders or area fills. This is because in order to obtain the best possible line quality printouts, print modes with a low number of passes are preferred, for example, two passes or less. On the other hand, to obtain the highest possible area fill uniformity, it is preferred to use print modes with a high number of passes, for example, eight passes or more.

This substantial performance difference between print modes with high and low numbers of passes makes it very difficult for a user to correctly select an optimal print mode for a given content to be printed, for example, a given plot content. Naturally, users of a printing device may learn with time what print modes are the most interesting, dependent on the content to be printed, the throughput requirements and the image quality expectations. Nevertheless, a user will learn this only through trial and error, which means that a significant amount of paper, ink and time are wasted until a user gets used to print modes meeting his image quality and throughput performance requirements. The longer the learning period is, the worse is the user's experience and, as a consequence, the printer usability perception. Also users may end up calling support lines for the printing device in an attempt to get advice on how to improve image quality and throughput.

Therefore, a need exists for improving printer usability and user experience. This is achieved by embodiments of the invention. Embodiments of the invention analyze the content of the image sent to print and rather than making the user to decide the optimal print mode, in accordance with the embodiments of the invention, the printer is made to decide the optimal print mode.

Embodiments of the invention will now be described with regard to an inkjet printing device, which is used for printing large format plots, as they are, for example, generated by architects. An embodiment of the invention makes the printer analyze the content of the plot that the user sends for printing. Once the plot data is analyzed, the printer classifies the content into three categories and decides the best print mode to print with highest image quality and throughput.

The first category concerns a plot having a plot content that comprises black lines only, also known as mono lines. An embodiment of the invention will select a print mode, which will be a one pass bidirectional print mode at a carriage speed of 60 inches per second (ips). This is a high productivity print mode allowing, for example, to print 180 documents of the format A1 per hour, but with an acceptable line quality for mono lines. For example, a dual matte black print head may be used that allows to print at a carriage speed of 60 ips without exceeding a maximum firing frequency limit.

The second category concerns a plot that contains, in addition to the black lines, also color lines, i.e. contains only black and color lines. For this category, a print mode is selected that will be a one pass bidirectional print mode at a carriage speed of 40 ips. Because of the firing frequency limitations with cyan, magenta and yellow print heads, the carriage speed has to be decreased in comparison to the print mode used for plots of the first category.

A third category covers plots, containing also renders, images and area fills. For this category, a two pass bidirectional print mode at a carriage speed of 40 ips is used. Two passes are required at least in order to provide an acceptable image quality when printing area fills.

The above-mentioned examples for the different categories apply, for example, to plains and other technical media. In media where the amount of renders and area fills is higher than lines, for example in coated, heavy weight coated or glossy renders, print modes with more passes may be applied to provide better area fill uniformity.

Figure 1:
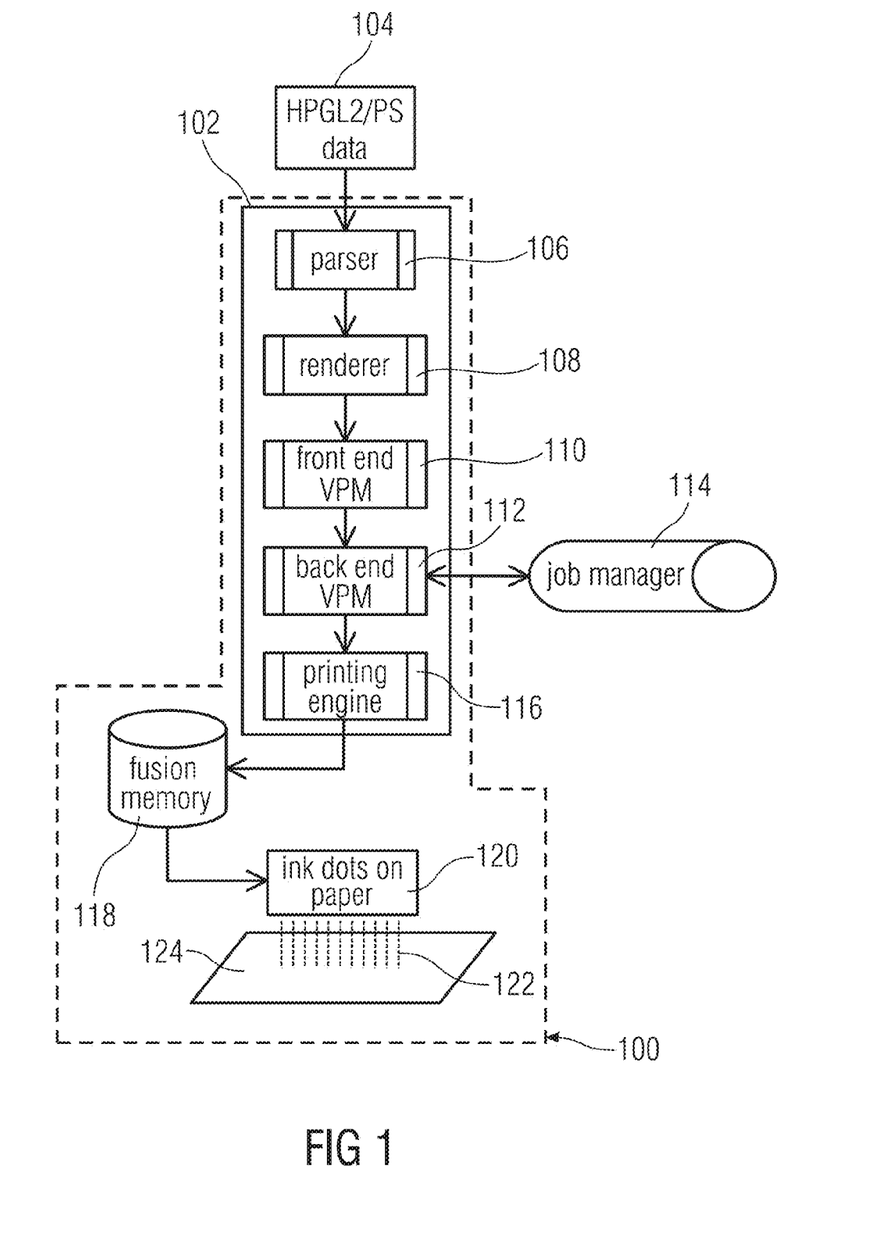
FIG. 1 is a schematic illustration of an inkjet printing device in accordance with an embodiment of the invention.

Further details of an inkjet printing apparatus according to an embodiment of the invention will now be described with regard to FIG. 1. FIG. 1 is a schematic representation of an inkjet printing device implementing the print mode selection in accordance with embodiments of the invention. The inkjet printing device 100 may, for example, be an inkjet plotter allowing large format plots to be printed. The invention is not limited to such kind of inkjet printers. Rather, embodiments of the invention may also be implemented in desktop printers using, for example, the A4 format as the main print medium. It is also noted that the invention is not limited to the inkjet printing technology. Rather, the same principles as described in accordance with embodiments in this application may be applied to other printers, for example, electro-photographic printers, also known as laser printers.

The inkjet printer 100 comprises a controller 102 comprising a plurality of modules for processing data representing contents to be printed by the inkjet printer 100 and for controlling operation of the inkjet printer 100. The print data describing the contents to be printed may be data generated from an HPGL/2 or PS driver, as is indicated at block 104 (HPGL/2=HP Graphic Language/2; PS=PostScript). The data indicated at block 104 may be generated by a CAD program and converted into the respective language by the corresponding driver. The data 104 is input into the controller 102 of the printer 100 and is received at a parser 106 that splits the plot into its different components. Graphic data that is detected is sent to the renderer 108. In the renderer 108, the HPGL/2 or PS data is converted into the printer raster language, which is then forwarded to the front end virtual page manager, also known as VPM 110. Here, raster data compression occurs and during compressing the data, it is analyzed to determine the plot content. The data is then forwarded to the back end VPM 112 in which a job manager 114 runs that classifies the plot content into one of the above-mentioned categories 1, 2 or 3 and that selects a corresponding print mode. From the back end VPM, the compressed data is forwarded to the actual print engine 116 transforming the compressed data into the necessary firing pulses, which are stored in a fusion memory 118 so that the printer 100 does not run out of data while printing, i.e. by means of the memory 118, a buffer for providing sufficient print data to the actual inkjet print mechanism 120 is provided. The inkjet print mechanism 120 may be an inkjet print head having one or more ink reservoirs and allowing, under control of the firing pulses in a known manner, to provide ink drops 122 onto a print medium 124.

FIG. 1 describes the overall process from the moment where the HPGL/2 or PS data is sent from the driver to the printer 100. This data is analyzed and ink drops are fired on the medium. As is shown in FIG. 1, the image content analysis is performed at the front end virtual page manager 110. The analysis is carried out during compression of the data generated after the rendering process. At the back end VPM 112, once the plot content is known, the print mode selection is generated by the job manager 114. In this way, compressed data is transformed into firing pulses by the printing engine 116 according to the print mode selected by the job manager 114 and, finally, the firing pulses are sent to the print heads 120 that fire the ink drops 122 on the medium 124.

Figure 2:
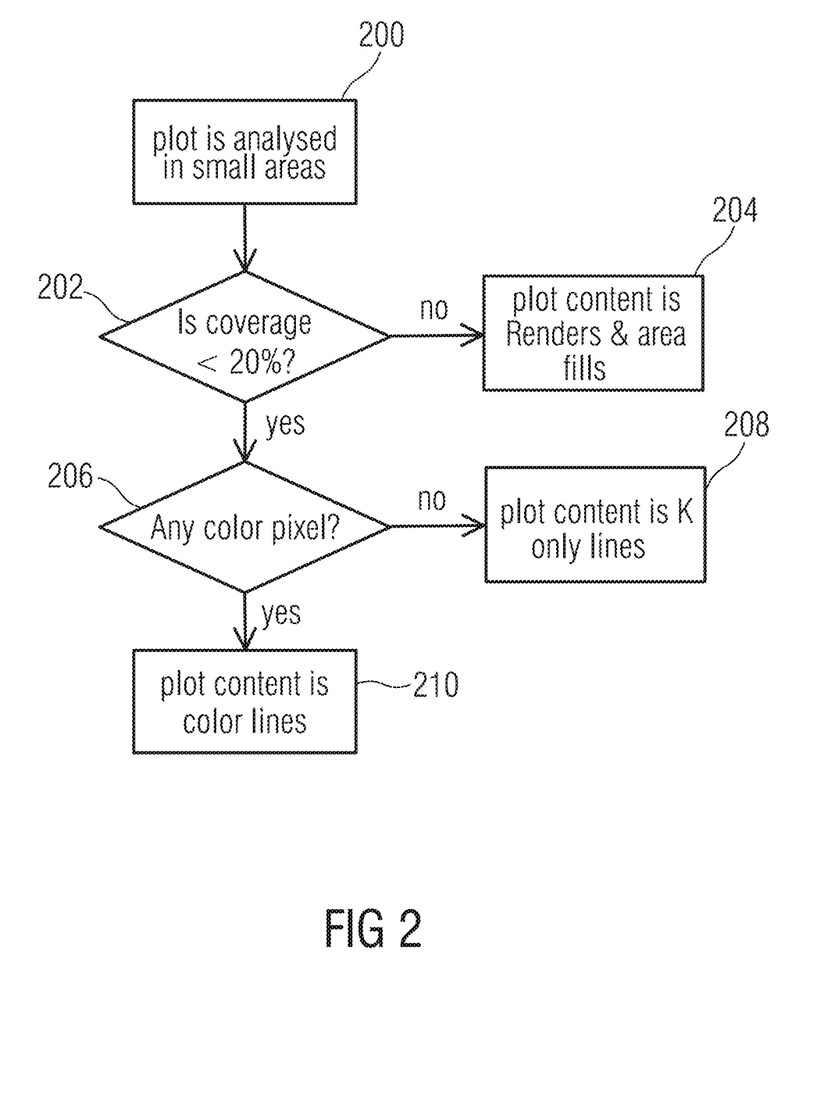
FIG. 2 is a flow chart depicting the analysis of the image content in accordance with an embodiment of the invention.

FIG. 2 describes a flow chart illustrating how an image content is analyzed at the front end VPM 110 (see FIG. 1) in accordance with an embodiment of the invention. At step 200, the plot to be printed is analyzed in small areas. In accordance with an embodiment of the invention, the whole contents of the page will be analyzed before starting to print, i.e. printing will only start after the processing is completed. This may result in the printer taking slightly longer to print. However, for 95% of the plots in the technical market, which mainly comprise line drawings, the additional processing time will hardly be noticeable. Thus, in step 200, the whole contents of a page to be printed is analyzed, for example, by dividing the entire page into small areas and analyzing each area separately and combining the analysis results of each area to obtain an overall analysis result for the complete page. In accordance with an embodiment of the invention, the analysis in step 200 comprises a determination of the ink coverage of the page to be printed, for example, by determining whether a specific pixel in the image to be printed has associated therewith information that it should be printed, for example a logical "1". Pixels, which are not to be printed, do not include information, for example a logical "0". To decide if a plot contains a line or area fills, the ink coverage is analyzed and plots containing lines typically show coverages lower than 20%, i.e. two pixels in every ten pixels contain information indicating that ink drops are to be provided to these two pixels. In case all analyzed pixels exclusively contain black information, it is possible to affirm that the plot contains mono lines only. In case that color information is detected at any pixel, the plot will be declared to contain both mono and color lines. If ink density is found to be higher than 20%, then the plot will be declared to contain renders, images or area fills. Embodiments of the invention may apply other thresholds, e.g. in the range between 10% and 30% coverage. Other embodiments may apply thresholds even blow 10%. For example, a plot containing only few lines may have an ink coverage of less than 10%, so that in such cases thresholds in the range between 1% and 10% coverage may be applied. Thus, in accordance with embodiments of the invention the thresholds may be in the range between 1% and 30% coverage.

As is shown in FIG. 2, once the analysis is completed in step 200 and the ink coverage is determined, the method proceeds to step 202 where it is determined as to whether the ink coverage is below 20%. In case it is determined that the ink coverage is above 20% in step 202, the method proceeds to step 204 where it is determined that the plot content comprises renders and area fills. Otherwise, in case it is determined in step 202 that the ink coverage is below 20%, it is further determined as to whether any of the pixels in the plot is a color pixel as it is shown in step 206. In case no color pixel is determined, the method proceeds to step 208 and determines that the plot only comprises K or black lines. Otherwise, in case it is determined in step 206 that a color pixel exists, it is determined in step 210 that the plot content comprises also color lines, i.e. only contains lines, however both mono and color lines.

Figure 3:
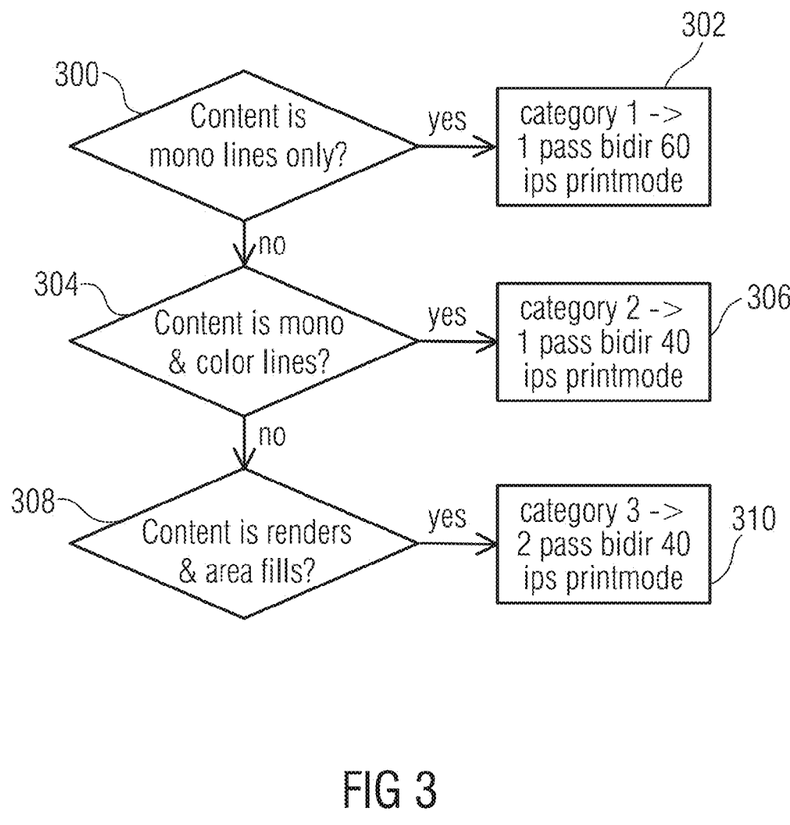
FIG. 3 is a flow diagram illustrating the print mode selection in accordance with an embodiment of the invention.

FIG. 3 shows a flowchart illustrating how a print mode is selected by the print job manager 114 (see FIG. 1) according to the plot category determined in accordance with FIG. 2. The print mode selection is performed by the job manager 114 running in the back end VPM 112 of the controller 102 of the printer 100. According to the plot content determined (see FIG. 2) at the front end VPM 110 (see FIG. 1), the job manager 114 will declare the plot as category 1, category 2 or category 3, and dependent on the category, a given print mode will be assigned. As is shown in FIG. 3, the print job manager determines in step 300 whether the plot content was determined to comprise mono lines only. If this is the case, the job manager will select at step 302 a print mode for the first category, namely a one pass bidirectional print mode operating at a carriage speed of 60 ips, as described above. Otherwise, in case the plot content is determined to be not mono lines only, the method proceeds from step 300 to step 304 where it is determined as to whether the plot was determined to comprise only mono and color lines. If this is true, in step 306 a print mode for the second category is selected which is a one pass bidirectional print mode operating at a carriage speed of 40 ips, as also described above. Otherwise, i.e. in case it is determined that the content is not only mono and color lines, the method proceeds the step 308 determining that the content contains renders and area fills so that a print mode for the third category is selected in step 310 which is a two pass bidirectional print mode operating at a carriage speed of 40 ips.

Embodiments of the invention may select only among two print modes, e.g. the above described first and second print modes. The first print mode is selected for documents including renders, images and area fills. The second print mode is selected for documents including only lines (color lines and/or black lines). Embodiments of the invention may apply different print modes, e.g. a one pass bidirectional print mode operating at a carriage speed of 30 ips for color lines and/or black lines, and a four pass bidirectional print mode operating at a carriage speed of 40 ips for images and area fills.

As described above, embodiments of the invention allow for an automatic selection of a print mode which is advantageous as the user will no longer need to acquire a deep knowledge about print mode performance which will ease the use and the user experience will improve. In addition, productivity will be increased as no more trail and error is needed. This means that there is no more waste of media, ink and user time. Also, users will no longer need to call support lines asking about print quality settings.

The approach in accordance with embodiments of the invention is advantageous over conventional approaches as the entire page to be printed is analyzed to determine a print mode which is used for printing the entire page, i.e. which is once set at the beginning of the print process and not changed during the printing of the page. This allows for the process as defined by embodiments of the invention to be easily implemented into existing systems as no high computational power is needed. Actually, in accordance with embodiments an analysis tool only needs to look at the contents associated with respective pixels and to determine as to whether the content has a first or a second value indicating whether the pixel is to be printed or not. Conventional approaches always tried to optimize the print mode with regard to area fill uniformity and selected print modes for various portions of a page to be printed. Contrary thereto, the approach in accordance with embodiments of the invention is advantageous as it is not only optimized for area fill printing but also for line drawings. Further, it is advantageous as for the entire page one selected print mode is used, i.e. there is no change of the print mode at some time during printing of the page, so that no artifacts are generated which may occur in prior art approaches due to the change of a print mode at a specific position yielding image quality defects which are visible in the printout. Yet another advantage of embodiments of the invention is that a user no longer has to consider the selection of a print mode, unless he wishes to do so, i.e. he may simply forget about the print mode selection and still obtain a high image quality at an optimum throughput.

The above embodiment was described on the basis of an inkjet printing device, like a plotter, however, also other inkjet printers may incorporate the method for selecting a print mode in accordance with the embodiments of the invention. Also printers using other printing technologies may be used, for example electro-photographic printers, like laser printers.

In the embodiment described above, content analysis and print mode selection was done by respective modules of the controller of the printer, however, the invention is not limited to such embodiment. Rather, such analysis and print mode selections may be done externally from the printing device, for example, in a computer on which an application runs by which the content to be printed was generated. For example, the respective print data may be sent to the printer together with the selected print mode. Alternatively, the content analysis and print mode selection may be done on a print server that is positioned remotely from the device on which the user's application runs and to which the user sends his data for printing. From the print server the data together with the print mode selected is forwarded to the printing device.

Figure 4:
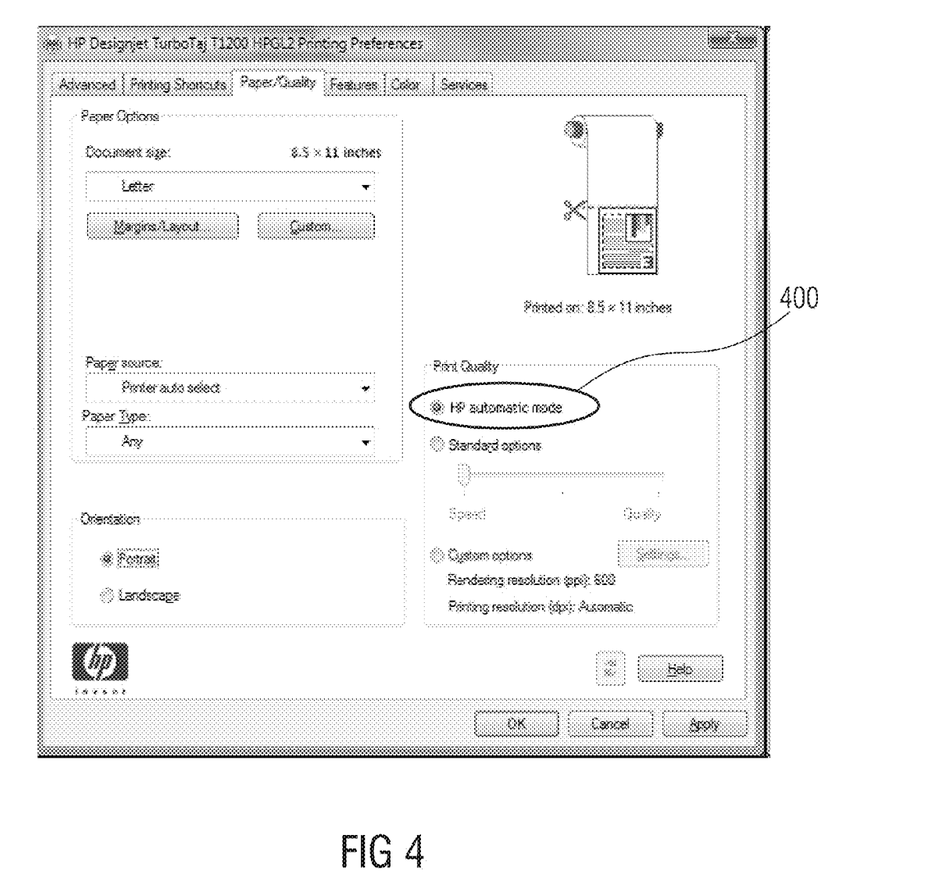
FIG. 4 is a photographic illustration of a driver window showing how to activate the print mode selection in accordance with an embodiment of the invention.

FIG. 4 shows a photographic representation of a driver window illustrating how the method in accordance with embodiments of the invention may be activated. To activate the method in accordance with embodiments to the invention, two main types of work flows were identified for the CAD technical market. The first way is that users will use a driver to send print jobs to the printer. In this case, in the respective driver window a radio button is provided in the "print quality" settings area. In FIG. 4 this button is indicated at 400. If enabled, the print mode will be selected by the printer according to the plot image content in a manner as described above. Otherwise, i.e. in case the radio button 400 is disabled, users will be able to select additional print modes from speed to quality as is indicated in the part of the "print quality" settings area below the automatic mode 400.

A second way to actuate the print select mode in accordance with embodiments of the invention is that users will use a HPGL/2 or PS job generated from applications. While this scenario is not as common as the one using a driver, it is important as many users select the "print to file" function to store jobs in HPGL/2 or PS as legacy files. To let the printer decide the most suitable print mode, a user activates the "hp automatic mode" in the image quality section in the front panel of the printer from which also classical print mode selection may be activated.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention may be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Embodiments of the invention comprise a data carrier having electronically readable control signals, which are capable of cooperating with a programmable computer system, such that one of the methods described herein is performed.

Figure 5:
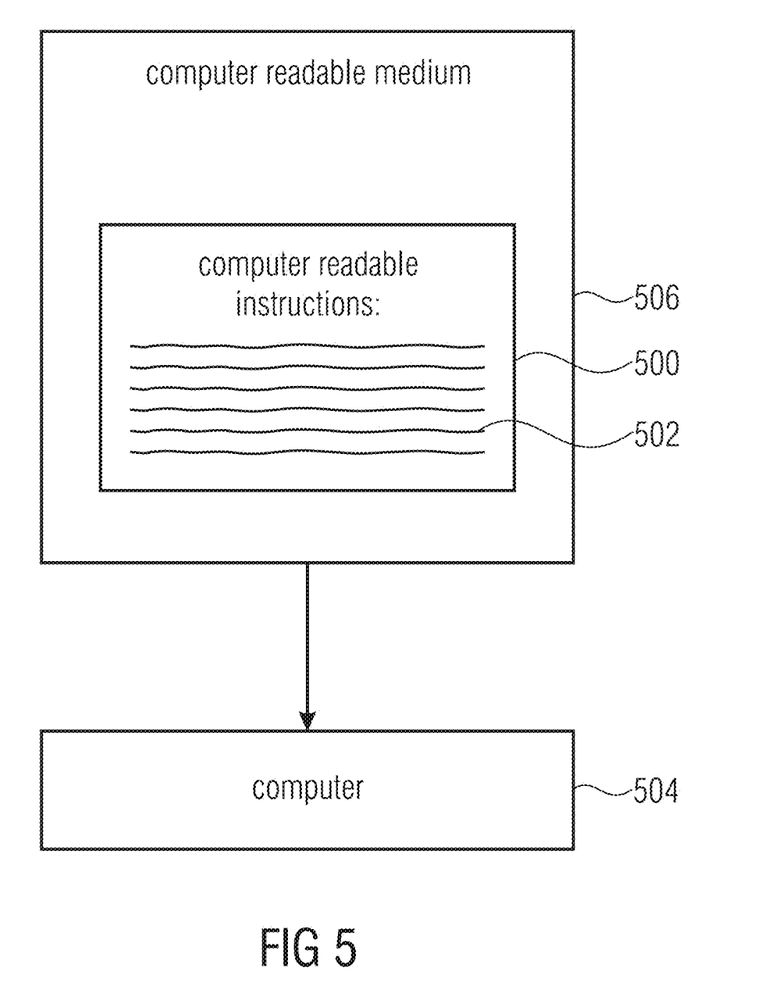
FIG. 5 is a schematic representation of a computer system in accordance with an embodiment of the invention.

Generally, embodiments of the present invention may be implemented as a computer program product with a program code, the program code being operative for performing one of the methods when the computer program product runs on a computer. The program code may for example be stored on a machine readable carrier. Embodiments comprise the computer program for performing one of the methods described herein, stored on a machine readable carrier. In other words, an embodiment of the inventive method as it is schematically shown in FIG. 5 is, therefore, a computer program 500 having a program code 502 for performing one of the methods described herein, when the computer program 500 runs on a computer 504. An embodiment of the inventive methods is, therefore, a data carrier 506 (or a digital storage medium, or a computer-readable medium) comprising, recorded thereon, the computer program 500 for performing one of the methods described herein.

An embodiment comprises a processing means, for example a computer, or a programmable logic device, configured to or adapted to perform one of the methods described herein. An embodiment comprises a computer having installed thereon the computer program for performing one of the methods described herein. Embodiments may use a programmable logic device such as a FPGA (field programmable gate array) or an AISIC (application specific integrated circuit) to perform some or all of the functionalities of the methods described herein. A field programmable gate array may cooperate with a microprocessor in order to perform one of the methods described herein. Generally, the methods may by performed by any hardware apparatus.

The above described embodiments are merely illustrative for the principles of the invention. It is understood that modifications and variations of the arrangements and the details described herein will be apparent to others skilled in the art. It is the intent, therefore, to be limited only by the scope and spirit of the impending patent claims and not by the specific details presented by way of description and explanation of the embodiments herein.

What is claimed is:

1. A method for selecting one of a plurality of print modes for printing a document, the method comprising:
   before starting to print the document:
      determining, by a controller, whether a print material coverage for a whole page of a document to be printed reaches a predefined threshold, wherein the print material coverage represents a number of pixels to be printed and the predefined threshold specifies a percentage of pixels of the page;
      selecting, by the controller, from a plurality of print modes a print mode for the whole page of the document to be printed dependent on the print material coverage of the whole page of the document to be printed;
      wherein selecting the print mode comprises:
         based on the threshold being reached, selecting a first print mode associated with a first type of document; and
         based on the threshold not being reached, selecting a second print mode associated with a second type of document and determining whether the document comprises at least one further predefined property.

2. The method of claim 1, wherein selecting the print mode comprises:
   in case the document comprises the at least one further predefined property, selecting the second print mode associated with the second type of document; and
   in case the document does not comprise the at least one further predefined property, selecting a third print mode associated with a third type of document.

3. The method of claim 2, wherein
   the document is a plot to be printed by an inkjet printing apparatus;
   the print material coverage is an ink coverage of the whole page of the plot to be printed;
   the at least one further predefined property comprises a pixel color;
   the first type of document is a document comprising at least one of the renders, images and one or more area fills;
   the second type of document is a document comprising only black lines and color lines; and
   the third type of document is a document comprising black lines only.

4. The method of claim 3, wherein the ink coverage is obtained by determining a ratio of the number of pixels to be printed on the whole page and the number of pixels not to be printed on the whole page.

5. The method of claim 1, wherein the first print mode is associated with a document having renders, images or area fills.

6. The method of claim 5, wherein the second print mode is associated with a document having lines only.

7. The method of claim 6, wherein the first print mode comprises printing using a first number of passes, and the second print mode comprises printing using a second number of passes, the first number of passes being higher than the second number of passes.

8. The method of claim 1, comprising
   providing to a user a graphical user interface, the graphical user interface comprising a select button allowing a user to select automatic print mode selection;
   wherein the print mode is automatically selected from the plurality of print modes dependent on the print material coverage of the whole page of the document to be printed, in case a user activated the select button.

9. The method of claim 1, wherein the document is to be printed by an electro-photographic printer, and wherein the print material coverage is a toner coverage on the whole page of the document to be printed.

10. The method of claim 1, wherein the print mode selection is done by a controller of a printer for printing the document.

11. A method for selecting by a controller of an inkjet printer one of a plurality of print modes for inkjet printing a plot, the method comprising:
   determining an ink coverage of the whole page of the plot to be printed by analyzing the pixels of the page;
   determining whether the ink coverage exceeds a predefined threshold;
   in case the ink coverage exceeds the predefined threshold, determining the plot as having renders, images or area fills and selecting a first print mode comprising printing using a first number of passes;

in case the ink coverage does not exceed the predefined threshold, determining whether the page comprises color pixels;

in case the page comprises color pixels, determining the plot as having only color and black lines and selecting a second print mode comprising printing at a first speed using a second number of passes;

in case the page does not comprise color pixels, determining the plot as having only black lines and selecting a third print mode comprising printing at a second speed using a third number of passes, the second speed being higher than the first speed, the first number of passes being higher than the second and third number of passes.

12. A non-transitory, computer readable storage medium comprising computer readable instructions for performing a method for selecting one of as plurality of print modes, when the computer readable instructions are executed by a computer, the computer is to:

before starting to print a document:

determine whether a print material coverage for a whole page of the document to be printed reaches a predefined threshold, wherein the print material coverage represents a number of pixels to be printed and the predefined threshold specifies a percentage of pixels of the page;

select from the plurality of print modes a print mode for the whole page of the document to be printed dependent on the print material coverage of the whole page of the document to be printed;

wherein to select the print mode comprises:

selecting a first print mode associated with a first type of document, based on the determination that the threshold is reached; and selecting a second print mode associated with a second type of document, based on the determination that the threshold is not reached; and determine, based on the determination that the threshold is not reached, whether the document comprises at least one further predefined property.

13. A printing apparatus, comprising:

a print mechanism for applying a print material to a print medium; and a controller having an input for receiving data defining a document to be printed, and an output for providing a control signal to the print mechanism;

wherein the controller is configured to:

before starting to print the document:

determine whether a print material coverage of a whole page of a document reaches a predefined threshold, wherein the print material coverage represents a number of pixels to be printed and the predefined threshold specifies a percentage of pixels of the page, select from a plurality of print modes a print mode for a whole page of a document to be printed dependent on the print material coverage of the whole page of the document to be printed;

wherein a first print mode associated with a first type of document is selected in case the threshold is reached, and a second print mode associated with a second type of document is selected in case the threshold is not reached; and determine whether the document comprises at least one further property, in case the threshold is not reached.

14. The printing apparatus of claim 13, wherein the first print mode is associated with a document having renders, images or area fills and comprises printing using a first number of passes; and the second print mode is associated with a document having only lines and comprises printing using a second number of passes, the first number of passes being higher than the second number of passes.

15. The printing apparatus of claim 13, wherein the controller is configured to:

select the second print mode associated with the second type of document, in case the document comprises the further property; and select a third print mode associated with a third type of document, in case the document does not comprise the further property, wherein the first print mode is associated with a document having renders, images or area fills and comprises printing at a first speed using a first number of passes;

wherein the second print mode is associated with a document having only color and black lines and comprises printing at a second speed using a second number of passes; and wherein the third print mode is associated with a document having only black lines and comprises printing at a third speed using a third number of passes, the first number of passes being higher than the second and third numbers of passes, and the third speed being higher than the first and second speeds.

16. The printing apparatus of claim 13, wherein the print mechanism is an inkjet print mechanism, and the print material is ink, or wherein the print mechanism is an electrophotographic print mechanism, and the print material is a toner.

17. The printing apparatus of claim 13, wherein the printing apparatus is an inkjet plotter;

wherein the print mechanism comprises an inkjet printing mechanism for applying ink to the print medium; and wherein the data received by the controller describe a plot to be printed;

wherein the controller is configured to determine an ink coverage of the whole page of the plot to be printed by analyzing the pixels of the page;

determine whether the ink coverage exceeds a predefined threshold;

determine the plot as having renders, images or area fills and select a first print mode comprising printing at a first speed using a first number of passes, in case the ink coverage exceeds the predefined threshold;

determine whether the page comprises color pixels, in case the ink coverage does not exceed the predefined threshold;

determine the plot as having only color and black lines and select a second print mode comprising printing at a second speed using a second number of passes, in case the page comprises color pixels; and determine the plot as having only black lines and select a third print mode comprising printing at a third speed using a third number of passes, in case the page does not comprise color pixels, the first number of passes being higher than the second and third number of passes, and the third speed being higher than the first and second speeds.

18. An apparatus, comprising:

means for printing a document;

a means for determining a print material coverage of a whole page of a document to be printed; and a controller for receiving data defining the document and for controlling the means for printing,
wherein the controller:
before starting to print the document:
selects from a plurality of print modes a print mode for the whole page of the document to be printed dependent on the print material coverage reaching a predetermined threshold; wherein the print material coverage represents a number of pixels to be printed and the predefined threshold specifies a percentage of pixels of the page;
wherein the controller selects a first print mode associated with a first type of document based on the threshold being reached and selects a second print mode associated with a second type of document based on the threshold not being reached; and
determines, based on the threshold not being reached, whether the document comprises at least one further predefined property.

* * * * *

UNITED STATES PATENT AND TRADEMARK OFFICE
CERTIFICATE OF CORRECTION

PATENT NO. : 8,711,425 B2  
APPLICATION NO. : 12/789752  
DATED : April 29, 2014  
INVENTOR(S) : Sergio Puigardeu et al.

Page 1 of 1

It is certified that error appears in the above-identified patent and that said Letters Patent is hereby corrected as shown below:

In the Claims,

In column 9, line 17, in Claim 12, delete "as" and insert -- a --, therefor.

In column 9, line 55, in Claim 13, delete "page," and insert -- page; --, therefor.

Signed and Sealed this
Second Day of June, 2015

Michelle K. Lee
*Director of the United States Patent and Trademark Office*